UNITED STATES PATENT OFFICE 2,461,180

COATED WELD ROD

Ernest Clarence Rollason, Waltham Abbey, England, assignor to Metal and Thermit Corporation, New York, N. Y., a corporation of New Jersey No Drawing. Application October 16, 1946, Serial No. 703,490. In Great Britain November 8, 1945

3 Claims. (Cl. 219—8)

This invention relates to the manufacture of flux-coated welding electrodes of the kind comprising a core wire, for example of mild steel, alloy steel or non-ferrous metal, having a coating containing flux ingredients in particulate form and, as binding agent therefor, an alkali metal compound such for example as sodium silicate as is normally used or sodium or potassium aluminate as claimed in British application No. 2691/44. The flux ingredients usually include in powder form manganese metal or ferro manganese, containing not more than 1.5% of carbon, for the purpose of deoxidising the weld metal and, if the core wire contains manganese as is frequently the case, to compensate for loss of manganese in the welding process.

In the manufacture of such flux-coated welding electrodes difficulties may be experienced due to a possible chemical reaction between the manganese metal or alloy on the one hand and the alkali metal compound used as a binding agent on the other hand. Such reaction is particularly likely to occur while the flux composition is in the moist state prior to being applied to the welding electrode core and is particularly disadvantageous in that it results in thickening and loss of plasticity with consequent increase in difficulty of application of the composition to the core. The reaction is also disadvantageous in that it leads to the generation of gas with resultant porosity of the coating composition and this risk persists after the coating composition has been applied to the core wire.

In order to inhibit the chemical reaction above referred to the manganese metal or alloy powder has been coated with wax but the wax film is easily removed during dry-mixing of the flux ingredients and furthermore the wax may be objectionable in the welding operation particularly in that it may give rise to irritating fumes.

Attempts have also been made to inhibit the reaction by forming an oxide film on the manganese metal or alloy by roasting it to a temperature of 200 to 300° C. but this roasting operation applied to such finely divided metal or alloy powder involves a risk of fire or explosion and the dust present during the roasting operation may constitute a health risk to the operatives.

We have now found that the chemical reaction above referred to may be partly or completely inhibited by alloying with the manganese metal or alloy a proportion of chromium and/or aluminum. By employing manganese-chromium or manganese-aluminum alloys in accordance with the present invention therefore it is possible to manufacture flux-coated welding electrodes in the conventional manner but without any special treatment of the manganese alloy. Preferably we employ a manganese-chromium alloy and in this case we find that the chemical reaction is inhibited to a sufficient extent as to enable us to dispose entirely with any special treatment of the manganese alloy powder.

The preferred manganese-chromium alloy for use in the present invention is:

|  | Per cent |
|---|---|
| Manganese | 50 to 98 |
| Chromium | 0.5 to 7 |
| Carbon not exceeding | 1.5 |
| Silicon not exceeding | 5 |
| Copper not exceeding | 5 |
| Iron with traces of normal impurities remainder | |

This alloy is pulverised suitably to pass a 30-mesh B. S. S. sieve and the resultant powder is sufficiently stable to alkali compounds that it may be used without pre-treatment in the manufacture of flux-coated welding electrodes of the kind hereinbefore described.

An aluminum alloy which may be used in accordance with the present invention is:

|  | Per cent |
|---|---|
| Manganese | 50 to 98 |
| Aluminum | 1 to 10 |
| Carbon not exceeding | 1.5 |
| Silicon not exceeding | 5 |
| Copper not exceeding | 5 |
| Iron with traces of normal impurities remainder | |

This alloy when pulverised, suitably to pass a 30-mesh B. S. S. sieve may be used in the manufacture of flux-coated welding electrodes of the kind hereinbefore described.

A manganese-chromium-aluminum alloy which may be used in accordance with the present invention is:

|  | Per cent |
|---|---|
| Manganese | 50 to 98 |
| Chromium | 0.5 to 7 |
| Aluminum | 0.5 to 5 |
| Carbon not exceeding | 1.5 |
| Silicon not exceeding | 5 |
| Copper not exceeding | 5 |
| Iron with traces of normal impurities remainder | |

A specific example of such an alloy is:

| | Per cent |
|---|---|
| Carbon | 0.2 |
| Chromium | 2.0 |
| Aluminum | 1.5 |
| Copper | 2.0 |
| Silicon | 4.0 |
| Sulphur | 0.05 |
| Phosphorus | 0.6 |
| Manganese | 80.0 |

Iron remainder.

Claim is made to the manganese-aluminum alloy in application Serial No. 26,931, filed May 13, 1948, which is a division hereof.

I claim:

1. A flux-coated welding electrode in which the flux ingredients comprise an alkali metal compound and a manganese-chromium alloy having a composition within the range:

| | Percent |
|---|---|
| Manganese | 50 to 98 |
| Chromium | 0.5 to 7 |
| Carbon not exceeding | 1.5 |
| Silicon not exceeding | 5 |
| Copper not exceeding | 5 |

Iron with traces of normal impurities remainder.

2. A flux-coated welding electrode in which the flux ingredients comprise an alkali metal compound and a manganese-chromium-aluminum alloy having a composition within the range:

| | Percent |
|---|---|
| Manganese | 50 to 98 |
| Chromium | 0.5 to 7 |
| Aluminum | 0.5 to 5 |
| Carbon not exceeding | 1.5 |
| Silicon not exceeding | 5 |
| Copper not exceeding | 5 |

Iron with traces of normal impurities remainder.

3. A flux-coated welding electrode in which the flux ingredients comprise an alkali metal compound and a manganese-chromium-aluminum alloy having the following composition:

| | Percent |
|---|---|
| Carbon | 0.2 |
| Chromium | 2.0 |
| Aluminum | 1.5 |
| Copper | 2.0 |
| Silicon | 4.0 |
| Sulphur | 0.05 |
| Phosphorus | 0.6 |
| Manganese | 80.0 |

Iron remainder

ERNEST CLARENCE ROLLASON.

REFERENCES CITED

The following references are of record in the file of this patent:

UNITED STATES PATENTS

| Number | Name | Date |
|---|---|---|
| 2,016,585 | Basore et al. | Oct. 8, 1935 |
| 2,291,482 | McLott | July 28, 1942 |